(12) United States Patent
Izuchi et al.

(10) Patent No.: US 6,902,848 B1
(45) Date of Patent: Jun. 7, 2005

(54) LITHIUM BATTERY INCLUDING A GEL ELECTROLYTE

(75) Inventors: Syuichi Izuchi, Osaka (JP); Seijiro Ochiai, Osaka (JP); Hiroe Nakagawa, Osaka (JP); Toshiyuki Watanabe, Kanagawa (JP); Takaaki Kishi, Osaka (JP)

(73) Assignee: Yuasa Corporation, Takatsuki (JP)

( * ) Notice: Subject to any disclaimer, the term of this patent is extended or adjusted under 35 U.S.C. 154(b) by 29 days.

(21) Appl. No.: 10/018,020

(22) PCT Filed: Jul. 17, 2000

(86) PCT No.: PCT/JP00/04793

§ 371 (c)(1),
(2), (4) Date: Dec. 14, 2001

(87) PCT Pub. No.: WO01/06591

PCT Pub. Date: Jan. 25, 2001

(30) Foreign Application Priority Data

Jul. 21, 1909 (JP) ............................................ 11/205528
May 15, 2000 (JP) ...................................... 2000/141286

(51) Int. Cl.$^7$ ............................. H01M 6/18; H01M 6/24
(52) U.S. Cl. ................... 429/300; 429/304; 429/231.95
(58) Field of Search ........................... 429/231.95, 300, 429/304, 329, 337

(56) References Cited

U.S. PATENT DOCUMENTS

| | | | | |
|---|---|---|---|---|
| 5,637,421 A | * | 6/1997 | Poehler et al. ............... | 429/303 |
| 5,972,539 A | * | 10/1999 | Hasegawa et al. .......... | 429/304 |
| 6,013,393 A | * | 1/2000 | Taniuchi et al. ............ | 429/303 |
| 6,534,214 B1 | * | 3/2003 | Nishijima et al. .......... | 429/212 |

FOREIGN PATENT DOCUMENTS

| | | |
|---|---|---|
| EP | 0 760 383 A | 5/1995 |
| EP | 0 823 744 A | 8/1997 |
| EP | 0 798 791 A2 | 10/1997 |
| EP | 0 880 189 A | 11/1998 |
| EP | 0 923 147 A | 12/1998 |
| JP | 5-303980 | 11/1993 |
| JP | 9-259924 | 10/1997 |
| JP | 10-245427 | 9/1998 |
| JP | 11-232925 | 8/1999 |
| JP | 11-242964 | 9/1999 |
| JP | 11-329064 | 11/1999 |
| JP | 2000-82328 | 3/2000 |
| JP | 2000-123873 | 4/2000 |
| JP | 2000-138039 | 5/2000 |

OTHER PUBLICATIONS

European Search Report dated Jun. 1, 2004 for EP 00944441 Application.
International Preliminary Examination Reported mailed Dec. 6, 2001, with English Translation for PCT/JP00/04793.
International Search Report dated Oct. 10, 2000 for PCT/JP00/04793.

* cited by examiner

Primary Examiner—Susy Tsang-Foster
(74) Attorney, Agent, or Firm—McGinn & Gibb, PLLC

(57) ABSTRACT

A lithium battery excellent in initial capacity, high rate discharge performance, low temperature performance and cycle life performance can be provided without the necessity of any special production step.

In other words, the present invention lies in a lithium battery having a power-generating element comprising at least a positive electrode, a negative electrode and a separator wherein a gel electrolyte comprising at least a polymer and a liquid electrolyte is used in at least a part of the power-generating element, characterized in that the concentration of lithium salt in the liquid electrolyte is from 1.5 to 5 mols per l of the liquid electrolyte.

29 Claims, 1 Drawing Sheet

LITHIUM BATTERY INCLUDING A GEL ELECTROLYTE

DESCRIPTION

1. Technical Field

The present invention relates to a lithium battery and more particularly to improvements in gel electrolyte for use in the positive electrode, negative electrode or separator of lithium battery.

2. Background Art

In recent years, portable apparatus such as portable telephone, PHS and small-sized personal computer have shown a remarkable tendency toward the reduction of size and weight with the development of electronics technique. Thus, batteries which are used as power supply for these apparatus have been required to have a smaller size and weight.

One of batteries which can be expected for such a purpose is a lithium battery. In addition to primary lithium batteries which have been already put to practical use, secondary lithium batteries have been required to come into the market and have a higher capacity and a prolonged life.

Since the foregoing various lithium batteries use a liquid electrolyte as its ionically-conductive material, all these lithium batteries are mostly in a cylindrical or prismatic form using a metallic can having a thick wall. Thus, a thin type lithium battery can be difficultly produced. Therefore, a thin type primary lithium battery using a thin metal foil has been put to practical use by a preparation process involving the use of a solid electrolyte instead of conventional liquid electrolyte and the application of printing technique. Applying these techniques, various researches and developments have heretofore been made also for the realization of practical use of thin-type secondary lithium battery using a gel electrolyte.

A cylindrical or prismatic secondary lithium battery is prepared by such a process that an electrode group made of positive electrodes, negative electrodes and separators is inserted in a cylindrical or prismatic battery case, and then a liquid electrolyte is injected into the battery case. On the contrary, a secondary gel electrolyte lithium battery is prepared by such a process that a positive electrode and a negative electrode are opposed to each other with a gel electrolyte provided interposed therebetween, and then those electrodes are packed and thus has an advantage in production. However, this gel electrolyte battery is disadvantageous in that it has deteriorated high rate charge and discharge performance and low temperature performance as compared with the cylindrical or prismatic battery.

This disadvantage is attributed to the following causes. Namely, the cylindrical or prismatic battery uses an electrolyte which is liquid and thus can easily undergo diffusion of lithium ion in the electrode and separator. On the contrary, since the gel electrolyte battery uses an electrolyte which is gel, the polymer contained in the electrolyte restricts the migration of ion, reducing the diffusion speed and hence deteriorating the high rate charge and discharge performance and low temperature charge and discharge performance to disadvantage.

Thus, as typical gel electrolytes having an enhanced lithium ion conductivity there have heretofore been widely studied gel electrolytes obtained by using a polyethylene oxide as a polymer skeleton and adding a liquid electrolyte made from lithium salts and organic solvents thereto. By predetermining the mixing ratio to lithium salts or to organic solvents, a lithium ion conductivity on the order of $1\times10^{-3}$ S/cm, which stands with comparison with that of liquid electrolyte, has been realized so far. A lithium battery comprising such gel electrolytes has substantially been put to practical use.

However, the foregoing lithium battery using a gel electrolyte represented by polyethylene oxide is disadvantageous in that it exhibits a sufficient battery performance during low rate discharge but still shows a slow diffusion of lithium ion during high rate discharge, making it difficult to keep the battery performance at a sufficient level.

The present invention has been worked out in the light of the foregoing problems. An object of the present invention is to provide a lithium battery which exhibits a gel electrolyte ion conductivity kept at a high level and allows smooth migration of lithium ion in the gel electrolyte without the necessity of any special production step to keep its performance at a sufficient level even during high rate discharge and have a prolonged life and a stable battery performance.

DISCLOSURE OF THE INVENTION

In order to solve the foregoing problems, the present invention lies in a lithium battery having a power-generating element comprising at least a positive electrode, a negative electrode and a separator wherein a gel electrolyte comprising at least a polymer and a liquid electrolyte is used in at least a part of the power-generating element, characterized in that the concentration of lithium salt in the liquid electrolyte is from 1.5 to 5 mols per l of the liquid electrolyte. The present invention is also characterized in that the weight fraction of the polymer constituting the gel electrolyte comprising at least a polymer and a liquid electrolyte is from 5 to 30% by weight based on the sum of the weight of the polymer and the liquid electrolyte. The present invention is further characterized in that the gel electrolyte is obtained by hardening a mixture of a liquid electrolyte and a monomer having at least two polymerizable functional groups in its molecular chain. The present invention is further characterized in that the lithium salt is $LiBF_4$. The present invention is further characterized in that the organic solvent constituting the liquid electrolyte contains γ-butyrolactone in an amount of not smaller than 50% by weight.

In other words, as a result of their extensive studies, the inventors found that the use of a gel electrolyte comprising a liquid electrolyte having a lithium salt dissolved therein in a concentration as high as about twice or more than the ordinary salt concentration of liquid electrolyte for lithium battery and a polymer makes it possible to obtain a good high rate discharge performance. Thus, the present invention has been worked out. In other words, the present invention lies in a lithium battery, characterized in that the concentration of lithium salt in the liquid electrolyte contained in at least one of positive electrode, negative electrode and separator is from 1.5 to 5 mols per l of the liquid electrolyte and the amount of the polymer is from 5 to 30% based on the weight of the polymer and the liquid electrolyte.

The concentration of lithium salt contained in the gel electrolyte is from 1.5 to 5 mols, preferably from 2 to 4 mols, more preferably from 2 to 3 mols per l of the liquid electrolyte. When the lithium salt concentration falls below 1.5 mols, the lithium ion concentration is small and the diffusion rate is small. When the lithium salt concentration exceeds 5 mols, the high salt concentration puts restrictions on the diffusion of lithium ion, reducing the diffusion rate of lithium ion and making it more likely that the precipitation of lithium salt can occur. The above defined range of salt concentration is preferred from the standpoint of difficulty in the precipitation of lithium salt.

Examples of the anion constituting the lithium salt which can be contained in the gel electrolyte include inorganic and organic anions. These lithium salts may be used singly or in combination of two or more thereof, as necessary. Examples of the inorganic anion include $BF_4^-$, $PF_6^-$, $ClO_4^-$, $AsF_6^-$, and $SCN^-$. Examples of the organic anion include $CnF_{2n+1}SO_3^-$ (n=0 to 5), $C(SO_2CnF_{2n+1})(SO_2C_mF_{2m+1})(SO_2C_pF_{2p+1})^-$ (n, m, p=0 to 5), $N(SO_2CnF_{2n+1})(SO_2C_m F_{2m+1})^-$ (n, m=0 to 5), and $RCOO^-$. Examples of R include groups represented by each of chemical formulae $CH_3-$, $^-OCOCH=CH-$, $^-OCO-C_6H_4-$, and $C_6H_5-$. Preferred among these lithium salts is $LiBF_4$ because it exhibits a good thermal stability and gives little problem of production of HF due to hydrolysis caused by the contamination by water.

Examples of the organic solvent to be contained in the gel electrolyte include lactones {γ-butrolactone, γ-valerolactone, etc.}, chain esters {methyl acetate, methyl propionate, ethyl propionate, etc.}, carbonic acid esters {ethylene carbonate, propylene carbonate, diethyl carbonate, methyl ethyl carbonate, dimethyl carbonate, diphenyl carbonate, etc.}, cyclic ethers {tetrahydrofuran, 2-methyltetrahydrofuran, 1,3-dioxolan, etc.}, chain ethers {1,2-dimethoxyethane, ethylene glycol methyl ethyl ether, diethylene glycol dimethyl ether, diethylene glycol diethyl ether, polyethylene glycol di($C_1$–$C_4$) alkylether having a polymerization degree of 3 or more, propylene glycol dimethyl ether, polypropylene glycol di($C_1$–$C_4$) alkylether having a polymerization degree of 2 or more, etc.}, N-methyloxazolidinone, sulfolanes {sulfolane, 2-methylsulfolane, etc.}, nitriles {acetonitrile, etc.}, sulfoxides {dimethyl sulfoxide, etc.}, amides {N,N-dimethylformamide, etc.}, and pyrrolidones {N-methylpyrrolidone, etc.}. These organic solvents may be used singly or in combination of two or more thereof as necessary. Preferred among these organic solvents are γ-butyrolactone, propylene carbonate, and ethylene carbonate from the standpoint of high dielectric constant, low vapor pressure and low flash point. An organic solvent containing γ-butrolactone in an amount of not smaller than 50% by weight is even more preferable because it gives a good high rate discharge performance when combined with a $LiBF_4$ salt having a good thermal stability.

The amount of the polymer to be contained in the gel electrolyte is preferably from 5% to 30%, more preferably from 10% to 25% based on the sum of the weight of the polymer and the liquid electrolyte. The polymer to be used in the gel electrolyte is not particularly limited. In general, however, it preferably swells somewhat in the liquid electrolyte. Examples of these polymers include acryloyl-based polymer, polyvinylidene fluoride, polyacrylonitrile, etc. Further, polymers obtained by the polymerization of monomers having a polymerizable functional group and soluble in the liquid electrolyte are preferred. Referring further to the foregoing gel electrolyte, it is preferably one obtained by hardening a mixture of a lithium salt, an organic solvent and a monomer having at least two polymerizable functional groups in its molecular chain.

Examples of the foregoing monomer having two or more polymerizable functional groups in its molecular chain include bifunctional (meth)acrylate (ethylene glycol di(meth)acrylate, propylene glycol di(meth)acrylate, polyethylene glycol di(meth)acrylate having a polymerization degree of 2 or more, polypropylene glycol di(meth)acrylate having a polymerization degree of 2 or more, di (meth) acrylate of polyoxyethylene/polyoxypropylene copolymer, butanediol di(meth)acrylate, hexamethylene glycol di(meth) acrylate, etc.), trifunctional (meth)-acrylate {trimethylolpropane tri(meth)acrylate, glycerin tri(meth)acrylate, tri(meth) acrylate of ethylene oxide adduct of glycerin, ethylene oxide of glycerin, tri(meth)acrylate of propylene oxide adduct, etc.}, tetrafunctional or higher (meth)acrylate {pentaerythritol tetra(meth)acrylate, diglycerin hexa(meth)acrylate, etc.}, etc. Further, monomers having the structure represented by the following chemical formula 1, 2 or 3 can be used.

Examples of the positive active material to be used in the invention include cobalt-based compounds such as $LiCoO_2$, nickel-based compounds such as $LiNiO_2$, manganese-based compounds such as $LiMn_2O_4$, titanium-based compounds such as lithium titanium oxide, vanadium-based compounds such as vanadium oxide-based active material, iron-based compounds such as iron phosphate-based active material, etc., but the present invention is not limited thereto. Examples of the negative active material include lithium metal, lithium alloy, and carbon-based compound such as graphite, but the present invention is not limited thereto.

In accordance with the invention, the following effects can be expected. Firstly, since the concentration of lithium salt in the gel electrolyte is high, polarization accompanying the migration of lithium ion can be relaxed during high rate discharge, providing a good charge and discharge performance.

Secondly, since the concentration of lithium salt in the positive electrode, negative electrode and separator is enhanced with respect to the organic solvent, the vapor pressure of the organic solvent in the electrolyte can fall, making it possible to inhibit the evaporation of the organic solvent that causes ignition.

Accordingly, in accordance with the invention, the following effects can be synergistically exerted, making it easy to provide a lithium battery excellent in reliability as well as in initial capacity, high rate charge and discharge performance, low temperature performance and safety.

Figure 1:
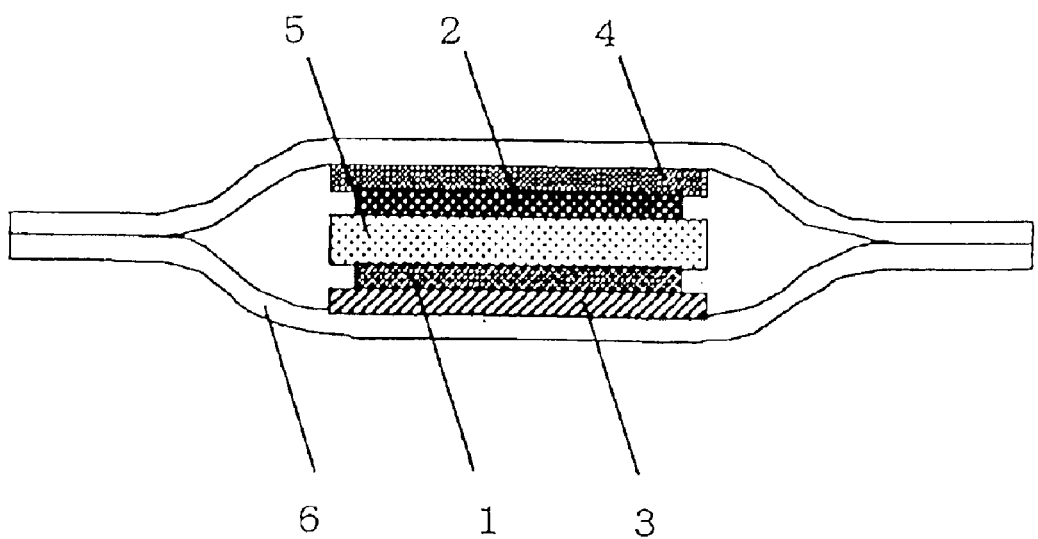
FIG. 1 illustrates a sectional view of the lithium battery of the invention.

The reference numerals 1, 2, 3, 4, 5 and 6 in FIG. 1 indicate a positive composite, a negative composite, a positive electrode current collector, a negative electrode current collector, a separator, and an aluminum laminate film.

BEST MODE FOR CARRYING OUT THE INVENTION

The present invention will be further described with reference to the following examples. The term "electrolyte solution" as used herein is meant to indicate a mixture of a liquid electrolyte having lithium salts dissolved in organic solvents and monomers having two or more polymerizable functional groups in its molecular chain. In the case where the polymer constituting the gel electrolyte is one obtained by the polymerization of a monomer having two or more polymerizable groups in its molecular chain as in the present example, the weight fraction of the polymer to the gel electrolyte corresponds to that of the monomer to the electrolyte solution.

(EXAMPLE 1)

FIG. 1 illustrates a sectional view of the lithium battery of the invention. 1 indicates a positive composite mainly comprising lithium cobalt oxide as a positive active material. The positive composite is applied to a positive electrode current collector 3 made of aluminum foil. 2 is a negative composite mainly comprising carbon as a negative active material. The negative composite is applied to a negative electrode current collector 4 made of copper foil. The positive composite 1 and the negative composite 2 are laminated with a separator 5 made of gel electrolyte provided interposed therebetween. The electrode group thus laminated is covered by an aluminum laminate film 6 which is then heat-fused at four sides thereof to prepare a lithium battery.

A process for the preparation of a lithium battery having the foregoing structure will be described hereinafter. The positive composite 1 was obtained as follows. Firstly, a mixture of lithium cobalt oxide as a positive active material, acetylene black as an electrically-conducting material and a 6.6 wt % N-methyl-2-pyrrolidone solution of a polyvinylidene fluoride as a binder (lithium cobalt oxide: acetylene black polyvinylidene fluoride=91:4.5:4.5 (by weight)) was applied to an aluminum foil (thickness: 15 μm) as the positive electrode current collector 3, and then dried. The coated aluminum foil was then pressed until the thickness of the composite layer reached 0.1 mm to obtain a positive active material sheet. Subsequently, a liquid electrolyte having 2.2 mols of LiBF$_4$ dissolved in 1 l of γ-butrolactone was mixed with an acrylate monomer having the structure represented by the chemical formula 1 in an amount of 15% based on the sum of the weight of the liquid electrolyte and the monomer to prepare an electrolyte solution. The foregoing positive active material sheet was then dipped in the electrolyte solution so that it was vacuum-impregnated with the electrolyte solution. Subsequently, the positive active material sheet was withdrawn from the electrolyte solution, and then irradiated with electron beam so that the monomer was subjected to polymerization to form a polymer. In this manner, the positive composite 1 was obtained. The negative composite 2 was obtained in the same manner as the positive composite 1 except that carbon was used as a negative active material and a copper foil (thickness: 10 μm) was used as a negative electrode current collector 4.

Chemical formula 1

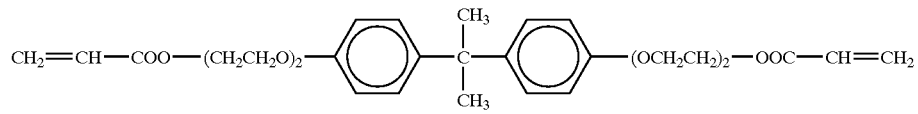

The separator 5 was obtained as follows. Firstly, a liquid electrolyte having 2.2 mols of LiBF$_4$ as a lithium salt dissolved in 1 l of γ-butrolactone as an organic solvent was mixed with a bifunctional acrylate monomer having the structure represented by the following chemical formula 2 in an amount of 10% based on the sum of the weight of the liquid electrolyte and the monomer. The mixture was applied to the positive composite 1, and then irradiated with electron beam so that the monomer was subjected to polymerization to form a polymer. Thus, a gel electrolyte separator was prepared.

Chemical formula 2

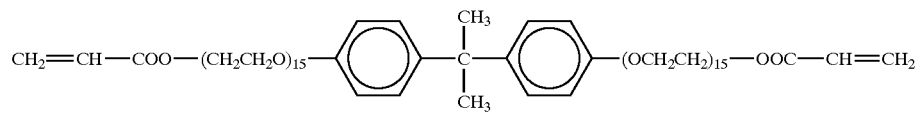

A battery was prepared as a battery A1 of the invention from the foregoing starting materials according to the foregoing preparation process.

(EXAMPLE 2)

A battery was prepared as a battery A2 of the invention in the same manner as the battery A1 of the invention except that a liquid electrolyte having 1.5 mols of LiBF$_4$ as a lithium salt dissolved in 1 l of γ-butrolactone was used in the step of producing positive electrode, negative electrode and separator.

(EXAMPLE 3)

A battery was prepared as a battery A3 of the invention in the same manner as the battery A1 of the invention except that a liquid electrolyte having 3 mols of LiBF$_4$ as a lithium salt dissolved in 1 l of γ-butrolactone was used in the step of producing positive electrode, negative electrode and separator.

(EXAMPLE 4)

A battery was prepared as a battery A4 of the invention in the same manner as the battery A1 of the invention except that a liquid electrolyte having 4 mols of LiBF$_4$ as a lithium salt dissolved in 1 l of γ-butrolactone was used in the step of producing positive electrode, negative electrode and separator.

(EXAMPLE 5)

A battery was prepared as a battery A5 of the invention in the same manner as the battery A1 of the invention except that a liquid electrolyte having 5 mols of LiBF$_4$ as a lithium salt dissolved in 1 l of γ-butyrolactone was used in the step of producing positive electrode, negative electrode and separator.

(EXAMPLE 6)

A battery was prepared as a battery C1 of the invention in the same manner as the battery A1 of the invention except that a trifunctional acrylate monomer (weight-average molecular weight: approx. 8,000) having the structure represented by the chemical formula 3 was used instead of the bifunctional acrylate monomer to be used in the preparation of separator 5.

Chemical formula 3

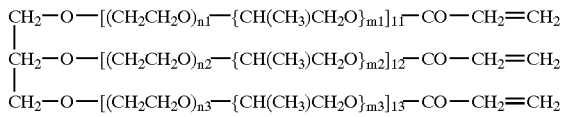

(wherein n1, n2, n3, m1, m2 and m3 each represents an integer of not smaller than 0)

(EXAMPLE 7)

A battery was prepared as a battery C2 of the invention in the same manner as the battery C1 of the invention except that a liquid electrolyte having 3 mols of $LiBF_4$ as a lithium salt dissolved in 1 l of γ-butyrolactone was used in the step of producing positive electrode, negative electrode and separator.

(EXAMPLE 8)

A battery was prepared as a battery E1 of the invention in the same manner as the battery A1 except that the content of the monomer in the electrolyte solution with which the positive active material sheet is vacuum-impregnated is 5% based on the sum of the weight of the liquid electrolyte and the monomer and the content of the monomer in the electrolyte solution to be used in the separator is 5% based on the sum of the weight of the liquid electrolyte and the monomer.

(EXAMPLES 9 TO 15)

Batteries E2 to E8 of the invention were prepared by changing the content of the monomer in the electrolyte solution with which the positive active material sheet is vacuum-impregnated and the content of the monomer in the electrolyte solution to be used in the separator as set forth in Table 4 similarly to Example 8.

(COMPARATIVE EXAMPLE 1)

A battery was prepared as a comparative battery B1 in the same manner as the battery A1 of the invention except that a liquid electrolyte having 1.2 mols of $LiBF_4$ as a lithium salt dissolved in 1 l of γ-butyrolactone was used in the step of producing positive electrode, negative electrode and separator.

(COMPARATIVE EXAMPLE 2)

A battery was prepared as a comparative battery B2 in the same manner as the battery A1 of the invention except that a liquid electrolyte having 6 mols of $LiBF_4$ as a lithium salt dissolved in 1 l of γ-butyrolactone was used in the step of producing positive electrode, negative electrode and separator.

(COMPARATIVE EXAMPLE 3)

A battery was prepared as a comparative battery D1 in the same manner as the battery C1 of the invention except that a liquid electrolyte having 1.2 mols of $LiBF_4$ as a lithium salt dissolved in 1 l of γ-butyrolactone was used in the step of producing positive electrode, negative electrode and separator.

(COMPARATIVE EXAMPLE 4)

A battery was prepared as a battery F1 of the invention in the same manner as the battery A1 except that the content of the monomer in the electrolyte solution with which the positive active material sheet is vacuum-impregnated is 4% based on the sum of the weight of the liquid electrolyte and the monomer and the content of the monomer in the electrolyte solution to be used in the separator is 4% based on the sum of the weight of the liquid electrolyte and the monomer.

(COMPARATIVE EXAMPLE 5)

A battery was prepared as a comparative battery F2 in the same manner as the battery F1 of the invention except that the content of the monomer in the electrolyte solution was 35%.

Subsequently, the batteries A1 to A5 of the invention and the comparative batteries B1 and B2 were each charged to a terminal voltage of 4.2 V with a current of 1 mA (corresponding to 10 hour rate) at a temperature of 20° C., and then discharged to 2.7 V at a high rate with a constant current of 20 mA (corresponding to 0.5 hour rate). These batteries were each then measured for discharge capacity. The results are set forth in Table 1.

TABLE 1

| | Designation of battery | Lithium salt concentration (mol/l) | 20° C., 20 mA discharge capacity (mAh) |
|---|---|---|---|
| Example 1 | A1 | 2.2 | 4.0 |
| Example 2 | A2 | 1.5 | 2.5 |
| Example 3 | A3 | 3.0 | 4.5 |
| Example 4 | A4 | 4.0 | 3.0 |
| Example 5 | A5 | 5.0 | 1.8 |
| Comparative Example 1 | B1 | 1.2 | 1.2 |
| Comparative Example 2 | B2 | 6.0 | 0.3 |

As can be seen in the results of Table 1, the batteries A1 to A5 of the invention exhibit a higher discharge capacity than the comparative batteries B1 and B2.

Subsequently, the batteries A1 and A2 of the invention and the comparative battery B1 were each charged to a terminal voltage of 4.2 V with a current of 1 mA (corresponding to 10 hour rate) at a temperature as low as −20° C., and then discharged to 2.7 V with a constant current of 2 mA (corresponding to 5 hour rate). These batteries were each then measured for low temperature discharge capacity. The results are set forth in Table 2.

TABLE 2

| | Designation of battery | Lithium salt concentration (mol/l) | −20° C., 2 mA discharge capacity (mAh) |
|---|---|---|---|
| Example 1 | A1 | 2.2 | 7.8 |
| Example 2 | A2 | 1.5 | 6.3 |
| Comparative Example 1 | B1 | 1.2 | 1.0 |

As can be seen in the results of Table 2, the batteries A1 and A2 of the invention exhibit an extremely high discharge capacity at low temperature as compared with the comparative battery B1.

Subsequently, the batteries C1 and C2 of the invention and the comparative battery D1 were each charged to a terminal voltage of 4.2 V with a current of 1 mA (corresponding to 10 hour rate) at a temperature of 20° C., and then discharged to 2.7 V at a high rate with a constant current of 20 mA (corresponding to 0.5 hour rate). These batteries were each then measured for discharge capacity. The results are set forth in Table 3.

TABLE 3

| | Designation of battery | Lithium salt concentration (mol/l) | 20° C., 20 mA discharge capacity (mAh) |
|---|---|---|---|
| Example 6 | C1 | 2.2 | 7.8 |
| Example 7 | C2 | 3.0 | 6.6 |
| Comparative Example 3 | D1 | 1.2 | 1.6 |

As can be seen in the results of Table 3, the batteries C1 and C2 of the invention exhibit an extremely high discharge capacity as compared with the comparative battery D1. This demonstrates that the present invention can be applied even if the monomers constituting the gel are different.

Subsequently, the batteries E1 to E8 of the invention and the comparative batteries F1 and F2 were each charged to a terminal voltage of 4.2 V with a current of 1 mA (corresponding to 10 hour rate) at a temperature of 20° C., and then discharged to 2.7 V at a high rate with a constant current of 20 mA (corresponding to 0.5 hour rate). These batteries were each then measured for discharge capacity. The results are set forth in Table 4.

TABLE 4

| Designation of battery | Concentration of monomer in electrode (%) | Concentration of monomer in separator (%) | Lithium salt concentration (mol/l) | 20° C., 20 mA discharge capacity (mAh) |
|---|---|---|---|---|
| Example 1 | A1 | 15 | 10 | 2.2 | 4.0 |
| Example 8 | E1 | 5 | 5 | 2.2 | 4.6 |
| Example 9 | E2 | 15 | 5 | 2.2 | 4.1 |
| Example 10 | E3 | 30 | 5 | 2.2 | 2.0 |
| Example 11 | E4 | 5 | 10 | 2.2 | 4.5 |
| Example 12 | E5 | 30 | 10 | 2.2 | 1.9 |
| Example 13 | E6 | 5 | 30 | 2.2 | 2.5 |
| Example 14 | E7 | 15 | 30 | 2.2 | 3.0 |
| Example 15 | E8 | 30 | 30 | 2.2 | 1.8 |
| Comparative Example 4 | F1 | 4 | 4 | 2.2 | 0 (short-circuited) |
| Comparative Example 5 | F2 | 35 | 35 | 2.2 | 1.3 |

As can be seen in Table 4, the batteries A1 and E1 to E8 of the invention exhibit a good discharge capacity as compared with the comparative batteries F1 and F2. The concentration of the monomer in the electrode and the separator were varied from 4% to 35%. When the concentration of the monomer were each 4%, the separator became mechanically weak to cause short-circuiting and the solution oozed from the electrode, giving practical problems. When the concentration of the monomer were each 35%, there were too much polymer that retarded the ion diffusion, deteriorating the high rate performance and hence giving practical problems.

While a gel electrolyte was used not only in the separator but also in the electrolyte in the electrode in the present examples, the present invention does not restrict the form of the electrolyte in the electrode. Accordingly, even in the case where a liquid electrolyte is used as the electrolyte in the electrode for either or both of the positive electrode and negative electrode, the effect of the invention can be effectively exerted so far as the electrolyte in the separator is a gel electrolyte.

As the separator there may be used not only one obtained by the method described in the examples but also one obtained by a method comprising impregnating a porous substrate such as nonwoven cloth with an electrolyte solution, and then irradiating the porous substrate with electron beam, which is laminated on the electrode for use.

INDUSTRIAL APPLICABILITY

As mentioned above, in accordance with the present invention, a lithium battery excellent in initial capacity, high rate discharge performance, low temperature performance and cycle life performance can be provided without the necessity of any special production step.

What is claimed is:

1. A lithium battery comprising:
   a power-generating element comprising a positive electrode, a negative electrode and a separator, each of which comprises a gel electrolyte comprising:
   a polymer comprising a polymerized polyfunctional (meth) acrylate monomer; and
   a liquid electrolyte, a concentration of lithium salt in said liquid electrolyte being in a range from 2 to 4 mols per liter of the liquid electrolyte, said gel electrolyte comprising said polymerized polyfunctional (meth) acrylate monomer in a range from 5% to 30% by weight, based on a total weight of said polymer and said liquid electrolyte,
   wherein said gel electrolyte in said separator comprises a polyfunctional (meth) acrylate monomer that is different than said polyfunctional (meth) acrylate monomer in said gel electrolyte in said positive and negative electrodes.

2. The lithium battery claimed in claim 1, wherein said gel electrolyte in at least one of said separator, said positive electrode and said negative electrode comprises said polymerized polyfunctional (meth) acrylate monomer in a range from 10% to 25% by weight, based on a total weight of said polymer and said liquid electrolyte.

3. The lithium battery claimed in claim 1, wherein said polyfunctional (meth) acrylate monomer comprises one of a bifunctional (meth) acrylate, a trifunctional (meth) acrylate, and a tetrafunctional (meth) acrylate.

4. The lithium battery claimed in claim 1, wherein said lithium salt comprises $LiBF_4$.

5. The lithium battery claimed in claim 1, wherein said liquid electrolyte comprises art organic solvent comprising γ-butyrolactone in an amount of not smaller than 50% by weight.

6. The lithium battery claimed in claim 2, wherein said polyfunctional (meth) acrylate monomer comprises a bifunctional (meth) acrylate monomer.

7. The lithium battery claimed in claim 2, wherein said lithium salt comprises $LiBF_4$.

8. The lithium battery claimed in claim 3, wherein said lithium salt comprises $LIBF_4$.

9. The lithium battery claimed in claim 2, wherein said liquid electrolyte comprises an organic solvent comprising γ-butyrolactone in an amount of not smaller than 50% by weight.

10. The lithium battery claimed in claim 3, wherein said liquid electrolyte comprises an organic solvent comprising γ-butyrolactone in an amount of not smaller than 50% by weight.

11. The lithium battery claimed in claim 4, wherein said liquid electrolyte comprises an organic solvent comprising γ-butrolactone in an amount of not smaller than 50% by weight.

12. The lithium battery claimed in claim 1, wherein said liquid electrolyte comprises from 2 to 3 mols per liter of said lithium salt.

13. The lithium battery claimed in claim 1, wherein said liquid electrolyte comprises a plurality of lithium salts.

14. The lithium battery claimed in claim 1, wherein said liquid electrolyte comprises an organic solvent comprising at least one of γ-butrolactone, propylene carbonate and ethylene carbonate.

15. The lithium battery claimed in claim 1, wherein said lithium salt comprises an inorganic anion comprising at least one of $PF_6^-$, $ClO_4^-$, $AsF_6^-$, and $SCN^-$.

16. The lithium battery claimed in claim 1, wherein said lithium salt comprises an organic anion.

17. The lithium battery claimed in claim 3, wherein said polyfunctional (meth) acrylate monomer comprises a bifunctional (meth) acrylate monomer.

18. The lithium battery claimed in claim 1, wherein said polyfunctional (meth) acrylate monomer comprises a trifunctional (meth) acrylate monomer.

19. The lithium battery claimed in claim 1, wherein an amount of said polyfunctional (meth) acrylate monomer in said gel electrolyte of said positive and negative electrodes is different than an amount of said polyfunctional (meth) acrylate monomer in said gel electrolyte of said separator.

20. The lithium battery claimed in claim 19, wherein said positive electrode comprises a positive electrode active material sheet which is vacuum impregnated with an electrolyte solution comprising a polyfunctional (meth) acrylate monomer which is polymerized to form said polymerized polyfunctional (meth) acrylate monomer of said positive electrode.

21. The lithium battery claimed in claim 20, wherein said positive electrode active material sheet comprises a positive electrode current collector and a positive composite material.

22. The lithium battery claimed in claim 21, wherein said positive composite material comprises one of $LiCoO_2$, $LiNiO_2$, $LiMn_2O_4$, lithium titanium oxide, a vanadium oxide-based material and iron phosphate-based material.

23. The lithium battery claimed in claim 22, wherein said negative electrode comprises a negative electrode active material sheet which is vacuum impregnated with said electrolyte solution comprising said polyfunctional (meth) acrylate monomer which is polymerized to form said polymerized polyfunctional (meth) acrylate monomer of said negative electrode.

24. The lithium battery claimed in claim 23, wherein said negative electrode active material sheet comprises a negative electrode current collector and a negative composite material.

25. The lithium battery claimed in claim 24, wherein said negative composite material comprises one of lithium metal, lithium alloy and a carbon-based compound.

26. The lithium battery claimed in claim 25, further comprising:
an aluminum laminate film covering said power-generating element and being heat-fused to formed said lithium battery.

27. A method of fabricating a lithium battery, said method comprising:
forming positive and negative electrodes; and
forming a separator between said positive and negative electrodes,
wherein said positive electrode, said negative electrode and said separator each comprise a gel electrolyte comprising:
a polymer comprising a polymerized polyfunctional (meth) acrylate monomer; and
a liquid electrolyte comprising from 2 to 4 mols per liter of said lithium salt, said gel electrolyte comprising said polymerized polyfunctional (meth) acrylate monomer in a range from 5% to 30% by weight, based on a total weight of said polymer and said liquid electrolyte, and
wherein said gel electrolyte in said separator comprises a polyfunctional (meth) acrylate monomer that is different than said polyfunctional (meth) acrylate monomer in said gel electrolyte in said positive and negative electrodes.

28. The method claimed in claim 27, wherein an amount of said polyfunctional (meth) acrylate monomer in said gel electrolyte of said positive and negative electrodes is different than an amount of said polyfunctional (meth) acrylate monomer in said gel electrolyte of said separator.

29. A lithium battery comprising:
positive and negative electrodes; and
a separator formed between said positive and negative electrodes,
wherein said positive electrode, said negative electrode and said separator each comprise a gel electrolyte comprising:
a polymer comprising a polymerized polyfunctional (meth) acrylate monomer; and
a liquid electrolyte comprising from 2 to 4 mols per liter of said lithium salt, said gel electrolyte comprising said polymerized polyfunctional (meth) acrylate monomer in a range from 5% to 30% by weight, based on a total weight of said polymer and said liquid electrolyte,
wherein said gel electrolyte in said separator comprises a polyfunctional (meth) acrylate monomer that is different than said polyfunctional (meth) acrylate monomer in said gel electrolyte in said positive and negative electrodes.

* * * * *